Nov. 11, 1958

F. J. LEMIEUX 2,859,656

APPARATUS FOR EXPOSING TITLES AND THE LIKE READING MATTER TO A TELEVISION ICONOSCOPE

Filed April 15, 1953

4 Sheets-Sheet 1

INVENTOR.

Frank J. Lemieux

BY Barlow & Barlow

ATTORNEYS.

Nov. 11, 1958

F. J. LEMIEUX 2,859,656

APPARATUS FOR EXPOSING TITLES AND THE LIKE READING MATTER TO A TELEVISION ICONOSCOPE

Filed April 15, 1953

4 Sheets-Sheet 2

INVENTOR.

Frank J. Lemieux

BY Barlow & Barlow

ATTORNEYS.

Nov. 11, 1958

F. J. LEMIEUX 2,859,656

APPARATUS FOR EXPOSING TITLES AND THE LIKE READING MATTER TO A TELEVISION ICONOSCOPE

Filed April 15, 1953

4 Sheets-Sheet 3

INVENTOR.
Frank J. Lemieux
BY
Barlow & Barlow
ATTORNEYS.

INVENTOR.
Frank J. Lemieux
BY
Barlow & Barlow
ATTORNEYS.

United States Patent Office 2,859,656

Patented Nov. 11, 1958

2,859,656

APPARATUS FOR EXPOSING TITLES AND THE LIKE READING MATTER TO A TELEVISION ICONOSCOPE

Frank J. Lemieux, Rumford, R. I., assignor to Progra Master Company, Incorporated, a corporation of Rhode Island Application April 15, 1953, Serial No. 349,065

5 Claims. (Cl. 88—16)

This invention relates to an apparatus for presenting two separate unrelated subjects to a single television iconoscope to be simultaneously photographed thereby and an apparatus for carrying out the said method.

The broad object of the invention is to provide an apparatus wherein two unrelated subjects to be televised may be exposed to a single television camera or iconoscope in such a manner that both subjects may be simultaneously photographed to appear simultaneously on a television screen.

A more specific object of the invention is to provide an apparatus for exposing titles, reading matter, and the like whereby a single iconoscope may photograph said matter simultaneously with other subjects being photographed thereby to appear simultaneously on a television screen.

Another object of the invention is to provide an apparatus for exposing to a television iconoscope titles, reading matter, and the like carried on a transparent film.

Another object of the invention is to provide an apparatus for moving a title, reading matter, and the like carrier in the focus of a television iconoscope.

Another object of the invention is to provide an apparatus for moving into the focus of a television iconoscope at a predetermined rate of travel a carrier of the titles, reading matter, and the like pertaining to the other subjects being televised.

Another object of the invention is to provide an apparatus for moving a film carrier in a flat condition into the focus of a television iconoscope.

With these and other objects in view, the invention consists of certain novel features of construction as will be more fully described and particularly pointed out in the appended claims.

Figures 1, 2, 3:
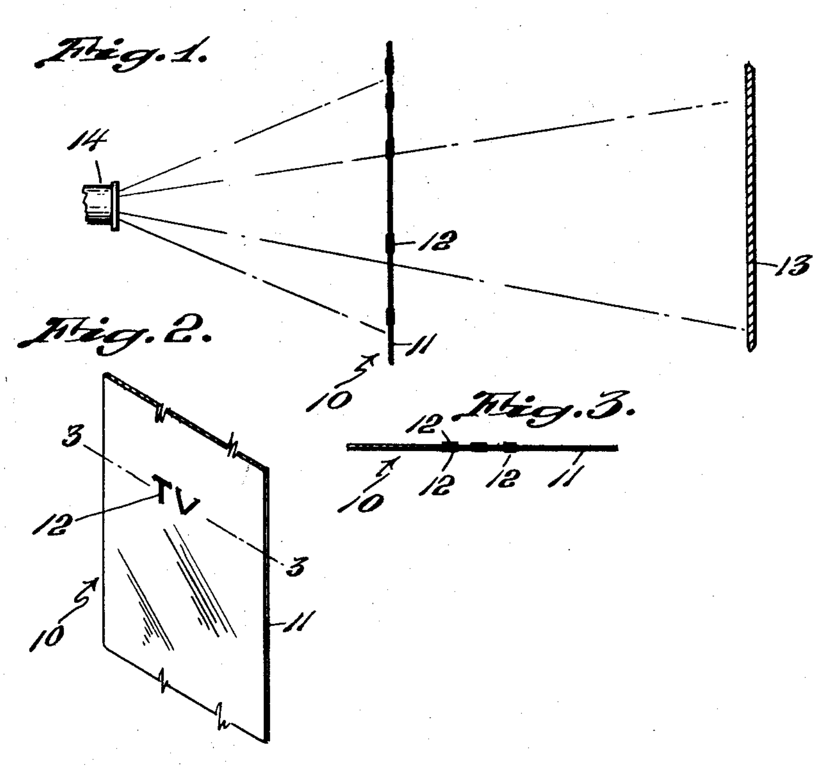
Figure 1 is a diagrammatic view illustrating a method of presenting two separate subjects to the television iconoscope to be simultaneously photographed thereby for televising the same.
Figure 2 is a fragmental portion of a carrier shown in Figure 1.
Figure 3 is a sectional view taken substantially along line 3—3 of Figure 2.

In carrying out my invention, I provide a carrier designated generally 10 (see Figures 1, 2, and 3) which may be in the form of a transparent film 11 having thereon a subject designated generally 12 to be televised simultaneously with other subjects 13 so as to appear simultaneously on a television screen. The term "subject" is herein employed in a broad sense, i. e. the subject 12 may be by way of example a title, reading matter, or the like, and the said subject 13 an action or performance with the appropriate scenery and other paraphernalia related to the performance. The subject 12, which in the instant application of the invention is the title of the performance being televised, is placed on the film 11 in any appropriate manner but preferably by means of a combined direct and offset printing process wherein the lettering of the said title is placed on both sides of the film in perfect register so as to provide a desired opaqueness of lettering. This film 11 with the said lettering thereon I arrange to be positioned or moved into the focus of the television camera designated generally 14 so that the film will be between the camera and the subject 13 being televised. Thus, the subject 13 will be photographed through the transparent film 11 so that on the television screen the title and the performance image will appear simultaneously. The film is moved at a predetermined desired or required speed to bring into focus the parts of the subject 12, which may involve a considerable stretch of film. Thus, I provide for the use of a single iconoscope to photograph simultaneously two separate and unrelated subjects as to kind.

The carrier 10 or film 11 may be wound on a spool designated generally 15 having a barrel or core 16 made of any suitable material and provided with flanged heads 17—17′, each having a bearing trunnion 18 for journaling the spool for rotation for unwinding the film therefrom.

Figures 5, 11:
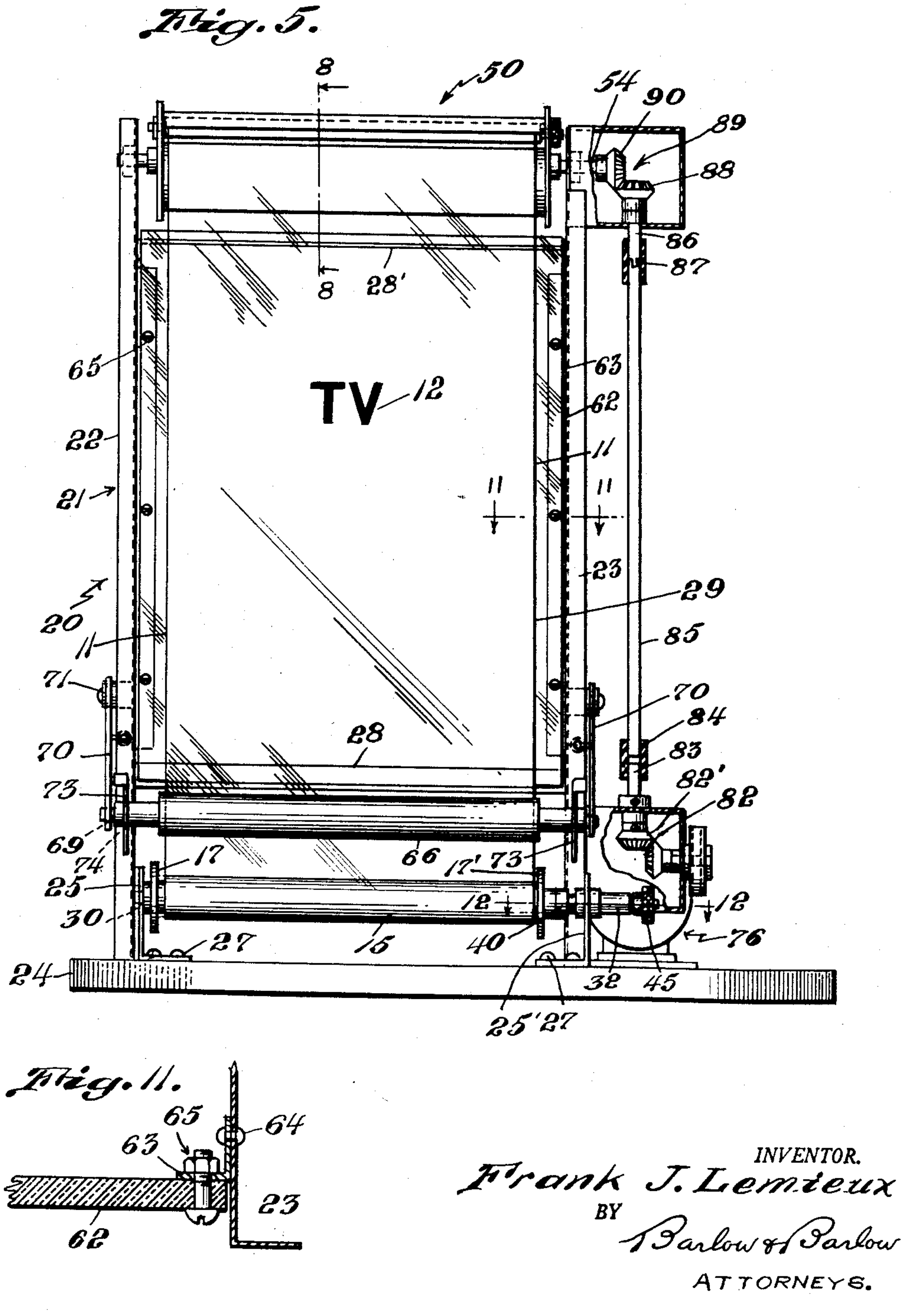
Figure 5 is a front elevational view of an apparatus for carrying out the method of the invention.
Figure 11 is a sectional view of a fragmental portion of the apparatus taken substantially along line 11—11 of Figure 5.
Figures 6, 7, 8, 9, 10:
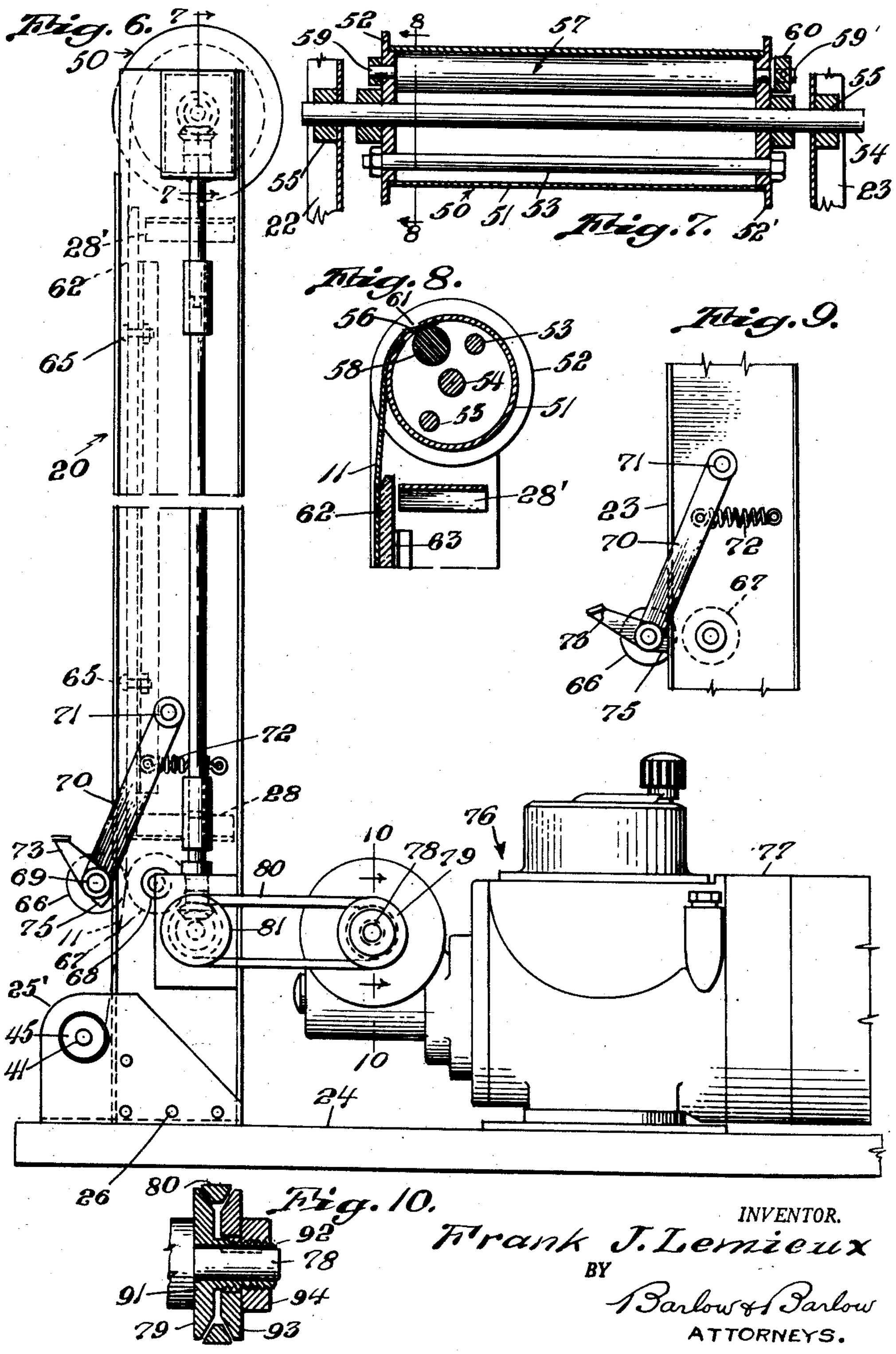
Figure 6 is an edge elevational view of the apparatus shown in Figure 5 on an enlarged scale.
Figure 7 is a sectional view taken substantially along lines 7—7 of Figure 6 with certain portions omitted.
Figure 8 is a sectional view taken substantially along line 8—8 of Figure 5.
Figure 9 is an edge view of a fragmental portion of the device as seen in Figure 6.
Figure 10 is a sectional view taken substantially along line 10—10 of Figure 6.
Figure 13:
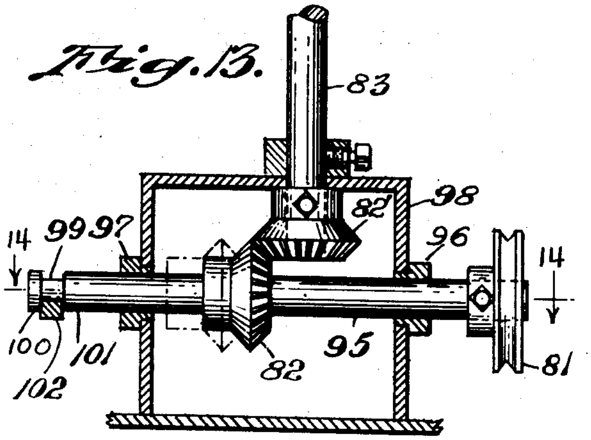
Figure 13 is a sectional view of a modified control for the drive of the film take-up drum.

In order to move the film 11 into the focus of the iconoscope 14, I provide an apparatus designated generally 20 (see Figures 5 and 6) comprising a frame structure 21 having opposite parallel sides 22 and 23 rising in a generally vertical direction from a base 24. The sides are similar and may be formed of channel iron material and provided with foot portions 25, 25′. These may be joined by welding to the sides or may be secured in place as by means of rivets or the like fastenings 26, as shown in Figure 6. The foot portions are in turn secured to the base 24 as by means of screw fastenings 27 (see Figure 5). A lateral brace 28 is secured to the said sides 22, 23 at their lower portion, and a similar lateral brace 28′ is secured to the said sides at the upper portion thereof, thus providing a rigid frame of generally rectangular form having an open center 29 bounded by the said sides and lateral braces.

Figures 4, 12:
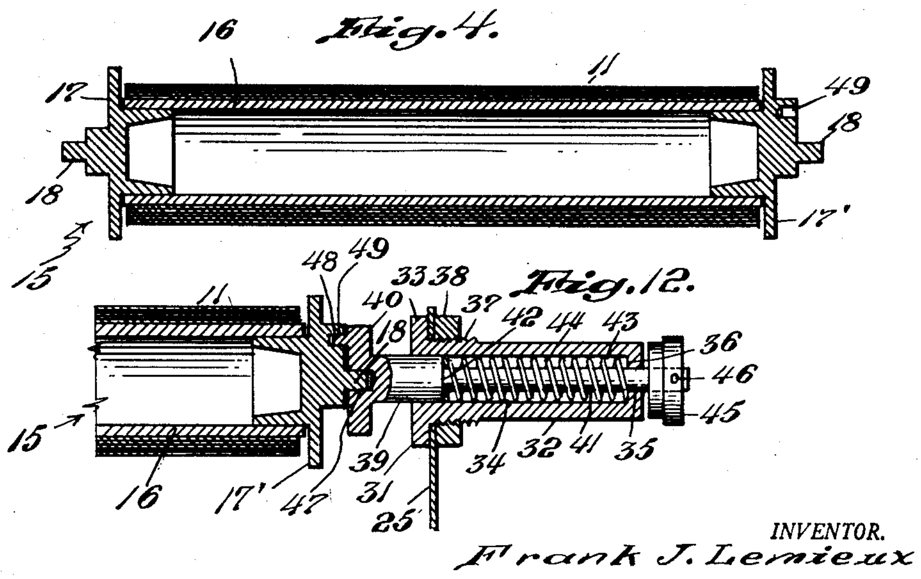
Figure 4 is a longitudinal sectional view of a spool adapted to have wound thereon the carrier shown in Figure 2.
Figure 12 is a sectional view taken substantially along line 12—12 of Figure 5.

The foot portions 25, 25′ extend forward of the sides of the frame, as seen in Figure 6, and the foot portion 25 has bearing opening 30 therethrough, and the foot portion 25′ has a larger opening 31 (see Figure 12) therethrough which is in line with the bearing 30 and receives a sleeve 32 (see Figure 12) which is provided with an annular flange 33 and a bore 34 extending therethrough which is reduced at its inner end portion as at 35 providing a shoulder 36. The sleeve 32 is externally threaded as at 37 adjacent to the flange 33 and receives a nut fastening 38 which clamps the foot portion 25′ between the flange 33 and nut 38 to secure the said sleeve in place. A plunger-like member 39 having an enlarged head 40 and a reduced shank portion 41 providing a shoulder 42 is rotatably received in the bore 34, the outer end portion of the shank 41 projecting outwardly through the said reduced bore portion 35. Thus, there is provided a chamber 43 in which a compression spring 44 is positioned to surround the shank 41 to act against the shoulders 36—42 to resiliently bias the plunger 39 to move outwardly of the sleeve. A nob 45 is attached to the outer end portion of the shank 41 as by means of a pin fastening 46 to provide an abutment to engage the outer end of the sleeve 32 so as to limit the outward movement of the said plunger. The knob 45 also provides a means to be manually engaged for retracting the plunger.

The head 40 is provided with a bearing opening 47 extending axially therein and a pin 48 projecting outwardly parallel to the axis of the plunger. The trunnions 18 of the spool 15 are received in the opening 30 and 47, and the pin 48 engages an opening 49 in the head designated 17′ which detachably secures the spool for rotation with the plunger 39. This arrangement provides for the quick removal and interchanging of spools 15.

The film 11 is led from the spool 15 to be attached to a take-up drum 50 (see Figures 5 and 6) which is suitably mounted on the sides 22, 23 at the upper end portion of the frame. The drum 50 is of a hollow construction and has a cylindrical core 51 (see Figures 7 and 8) which is supported at its end on heads 52, 52′ each having an annular flange extending beyond the periphery of the core 51. Tie bolts 53 secure the heads to each other. A shaft 54 extends through the drum and is journaled in bearings 55 provided on the sides 22, 23, the shaft 54 being fastened to the drum for rotation in unison therewith. In order to detachably secure the leading end 56 (Figure 8) of the film 11 to the drum 50, a clamp arrangement designated generally 57 (Figure 7) is provided and comprises a roller 58 having trunnions 59, 59′ journaled in the heads 52. The trunnion 59′ is made to extend beyond the head 52′ and has attached thereto a nob 60 for manually turning the roller 58. The roller 58 is made of a yielding material which may be of a natural rubber or synthetic material as conditions may require and is positioned closely adjacent to the inner side of the core 51. A lateral slot 61 (Figure 8) is provided in the core 51 adjacent to the roller 58 to extend substantially the entire length of the roller providing an entrance for the said leading edge 56 to be passed within the core 51 to be positioned at the bite of the roller and core 51. Rotating the said roller 58 will advance the film into clamping relation between the adjacent surfaces of the roller 58 and the core 51. Rotating the drum 50 will cause the film to be wound upon the same and to be withdrawn from the spool 15 across the said opening 29.

The length or stretch of film 11 between the spool 15 and the drum 50 is such that there is a tendency for the film to buckle and present the matter 12 thereon in a distorted condition with reference to the camera 14. In order to avoid such film condition, I provide a transparent plate 62 (see Figures 6 and 11) which preferably may be made of a transparent synthetic material such as is known as methyl methacrylate (Lucite). The plate 62 is positioned to extend across the opening 29 to abut against ledges 63 which may be formed by lengths of angle iron material attached to the sides of the frame as by means of rivets 64. The plate is secured in place against the ledges 63 by bolts and nut fastenings 65. Thus, a transparent backing is provided for the film 11 to be moved thereover in a flat condition. In order to further assure the film's being moved in a flat condition, a pair of tension rollers 66—67 are provided (Figures 5 and 6). The surfaces of these rollers may be made of a suitable yielding material such as rubber to prevent scratching or marring the film 11 or matter 12 thereon. The roller 67 is journaled in bearings 68 fastened to the sides of the frame. The roller 66 is journaled in bearing openings 69 in arms 70 which are pivotally secured to the sides of the frame as at 71 whereby the roller 66 may be moved toward or from the roller 67. A pull spring 72 biases the roller 66 into engagement with the said roller 67. The film 11 is passed between these tension rollers, which hold the stretch of film between the same and the drum 50 in a taut and flat condition. In order to facilitate the quick and easy threading of the film 11 between the tension rollers, levers 73 are pivotally mounted to the shaft of the roller 66 as at 74 to be held in the normal position thereof as shown in Figure 6. Levers 73 are each provided with a short arm 75 having a cam face so that when the levers 73 are rocked to the position shown in Figure 9 to engage the adjacent frame, they will hold the rollers 66, 67 spaced from each other.

In order that the drum 50 may be rotated at a predetermined desired speed, I provide a variable drive designated generally 76 (see Figure 6) which may be of any well-known manufacture and which may be manually controlled to produce any of various desired speeds of rotation. In the present disclosure this drive 76 which includes a motor 77 is mounted on the base 24, and its delivery shaft 78 has attached thereto a V pulley 79 from which power is transmitted by means of an endless V belt 80 to a second V pulley 81. This V pulley transmits power to a pair of mitre bevelled gears 82, 82′ (Figure 5). The shaft 83 of the mitre gear 82′ is coupled by means of a flexible coupling 84, which may be a rubber sleeve, to a generally vertical shaft 85, the upper end of which is connected to a shaft 86 by means of a clutch arrangement 87, the shaft 86 in turn being attached to the gear 88 of a pair of mitre gears 89, the gear 90 of which is attached to the shaft 54 of the drum 50. Thus, the drum 50 is mechanically rotated by means of the said variable drive 76 at any desired speed which may be predetermined for providing the desired result of moving of the film 11 into the focus of the camera or iconoscope 14.

It is desirable that when unwinding the spent film from the drum 50 the same be free to rotate independently of the drive 76, and to this end the V pulley 79 may be of any suitable manufacture whereby the same may be manipulated to cause a slackening of the belt 80. In the instant disclosure (see Figure 10) the pulley 79 is made into two parts including a disc 91 having a threaded hub 92. The other disc 93 of the pulley is received on the hub 92, and a nut 94 threadingly engages the hub 92 to move the discs 93 toward the discs 91 in proper relation therewith. In order to slacken the belt 80, the nut 34 is turned in the opposite direction, which will permit the discs 91, 93 to separate. Thus, it will be seen that the drum 50 may be freed of its drive by unclutching the pulley 79 or by disengaging the clutch 87 so that the film 11 may be withdrawn to be rewound on the core 16 by manually or otherwise rotating the said core 16.

In the structure so far described, the take-up drum 50 is set into rotation upon the motor being set into motion, and the drum 50 is arrested by arresting the motion of the motor. In some instances it may be desirable to provide other means controlling the rotation of the take-up drum. To this end the shaft 95 of the V pulley 81 is extended and slidably mounted axially in bearings 96, 97 provided in the housing 98 of the mitre gears 82, 82′. The shaft 95 extends beyond the side wall of the housing 98 and is provided with an annular groove 99 therein providing shoulders 100 and 101. The gear 82 is mounted on the shaft 95 and is movable in and out of engagement with the gear 82′ by axially sliding the said shaft 95 in one or the other direction. A manually operated lever 102 (see Figure 14) is pivotally mounted as at 103 on a suitable support, not shown, and extends therefrom into the recess 99. As will be apparent, swinging of the lever 102 in one or the other direction will cause the portion thereof in said recess 99 to engage one or the other of shoulders 100, 101 to axially move the said shaft 95 in one or the other direction to engage or disengage the gear 82 mounted thereon. Thus the motor may be set into motion and the shaft 95 rotated and so maintained during the period of operation of the device whereby the rotation of the take-up drum may be manually controlled.

Figures 14, 15:
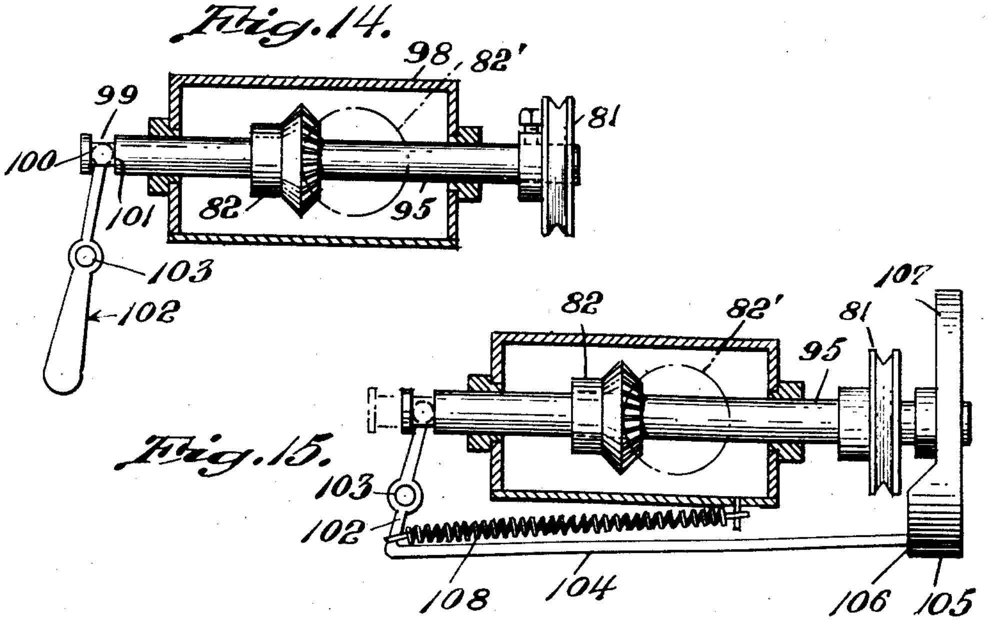
Figure 14 is a sectional view taken substantially along lines 14—14 of Figure 13.
Figure 15 is a sectional view of a further modification of control for the drive of the film take-up drum.

In Figure 15 I have shown an arrangement whereby the gear 82 may be automatically moved into and out of engagement with the gear 82'. In this arrangement I extend one arm of the lever as at 104 to engage with a cam 105 attached to the shaft 95 adjacent to the V pulley 81, this cam 105 having a lobe 106 thereon and a low portion 107. In the arrangement shown the gear 82 is biased out of engagement with the gear 82' by means of a pull spring 108. However, the gear 82 may be, if desired, resiliently biased into engagement with the gear 82'. Upon the rotation of the shaft 95 and thereby the cam 105, the lever 102 will be swung about its pivot 103 in one direction and returned in the opposite direction by the spring 108. Thus the gear 82 will be moved in and out of engagement with the gear 82'. By proportioning the lobe 106 to the surface 107, the duration of the time of engagement of the gears 82 and 82' with each other may be readily controlled. Thus by choosing a proper diameter of take-up drum 50, the length of film moved for each portion of rotation of the shaft 95 may be readily provided for.

I claim:

1. An apparatus for exposing reading matter and the like to a television iconoscope to be photographed thereby simultaneously with other subjects exposed to said iconoscope comprising an open frame, spaced bearings at one end portion of said frame adapted to receive a roll package of transparent film on which said reading matter appears, a rotatable take-up drum at the opposite end portion of said frame to which said film is led to be wound thereon as drawn from said roll package, a pair of tension rollers between which said film passes, one of said tension rollers mounted for swinging movement toward and from the other tension roller, means for holding said rollers in spaced relation, a variable speed power source and means for connecting said power source to said drum for rotating the same at a predetermined speed whereby said film will be advanced between said rollers and drum in a desired time relation to present said reading matter thereon to said iconoscope.

2. An apparatus as set forth in claim 1 in which one of said spaced bearings is carried by a spring pressed plunger.

3. An apparatus for exposing reading matter and the like to a television iconoscope to be photographed thereby simultaneously with other subjects exposed to said iconoscope comprising an open frame, spaced bearings at one end portion of said frame, a delivery roller adapted to have wound thereon a transparent film on which said reading matter appears, said roller having a trunnion at each end thereof for journalling said roller in said bearings, one of said bearings including a spring pressed plunger having a bearing opening for receiving one of said trunnions, said roller having an opening in the end thereof adjacent the said one of said trunnions, a rotatable lock pin carried by said plunger for engaging in said opening for detachably securing said roller to said bearing for rotation therewith and a take-up drum at the other end portion of said frame to which said film is led to be wound thereon as drawn from said roller.

4. An apparatus as in claim 3 including means for rotating said take-up drum and tension means restraining the transparent film as it is drawn from the delivery roll by the take-up drum.

5. An apparatus for exposing reading matter and the like to a television iconoscope to be photographed thereby simultaneously with other subjects exposed to said iconoscope comprising an open frame, spaced bearings at one end portion of said frame adapted to receive a roll package of transparent film on which said reading matter appears, a rotatable take-up drum at the opposite end portion of said frame to which said film is led to be wound thereon as drawn from said roll package, a transparent plate extending across said frame and secured to the sides thereof and over which plate said film passes as drawn from said roll package, a pair of tension rollers between which said film passes, a variable speed power source and means for connecting said power source to said drum for rotating the same at a predetermined speed whereby said film will be advanced over said plate in a desired time relation to present said reading matter thereon to said iconoscope, said means including a shaft coupled at one end by a resilient sleeve and at the other end to said drum by clutch means.

References Cited in the file of this patent

UNITED STATES PATENTS

| | | |
|---|---|---|
| 274,768 | Henderson | Mar. 17, 1883 |
| 915,111 | Price | Mar. 16, 1909 |
| 1,230,262 | Zwisler | June 19, 1917 |
| 1,292,149 | Teague | Jan. 21, 1919 |
| 1,300,178 | Lane | Apr. 8, 1919 |
| 1,669,407 | Artigue | May 15, 1928 |
| 1,764,490 | Artigue | June 17, 1930 |
| 1,767,668 | Griffith | June 24, 1930 |
| 1,885,555 | Schwartz | Nov. 1, 1932 |
| 2,202,883 | Yoder | June 4, 1940 |
| 2,461,285 | Kleintop | Feb. 8, 1949 |

FOREIGN PATENTS

| | | |
|---|---|---|
| 21,842 | Great Britain | of 1909 |